US012583670B2

(12) United States Patent
Kappers et al.

(10) Patent No.: US 12,583,670 B2
(45) Date of Patent: Mar. 24, 2026

(54) LIFT ARM ASSEMBLY FOR A FRONT END LOADING REFUSE VEHICLE

(71) Applicant: Oshkosh Corporation, Oshkosh, WI (US)

(72) Inventors: Jerrod Kappers, Oshkosh, WI (US); Vincent Hoover, Byron, MN (US); Joshua Rocholl, Rochester, MN (US); Logan Gary, Oshkosh, WI (US); Jacob Solberg, Oshkosh, WI (US); Dave Giere, Oshkosh, WI (US); Emily Davis, Rochester, MN (US); Zach Klein, Rochester, MN (US); Derek Wente, Austin, MN (US); Vince Schad, Oshkosh, WI (US); Clinton Weckwerth, Pine Island, MN (US)

(73) Assignee: Oshkosh Corporation, Oshkosh, WI (US)

( * ) Notice: Subject to any disclaimer, the term of this patent is extended or adjusted under 35 U.S.C. 154(b) by 505 days.

(21) Appl. No.: 17/671,719

(22) Filed: Feb. 15, 2022

(65) Prior Publication Data

US 2022/0258967 A1 Aug. 18, 2022

Related U.S. Application Data

(60) Provisional application No. 63/150,370, filed on Feb. 17, 2021.

(51) Int. Cl.
*B65F 3/04* (2006.01)
*B65F 3/02* (2006.01)

(52) U.S. Cl.
CPC ...... *B65F 3/041* (2013.01); *B65F 2003/0279* (2013.01)

(58) Field of Classification Search
CPC .............. B65F 3/041; B65F 2003/0279; B65F 2003/0266; B65F 3/06
See application file for complete search history.

(56) References Cited

U.S. PATENT DOCUMENTS

| | | | |
|---|---|---|---|
| 9,981,803 | B2 | 5/2018 | Davis et al. |
| 10,800,605 | B2 | 10/2020 | Rocholl et al. |
| 10,843,379 | B2 | 11/2020 | Rocholl et al. |

(Continued)

OTHER PUBLICATIONS

Heil Environmental, Freightliner Facebook video, https://www.facebook.com/HeilEnvironmental/videos/vb.248460091865486/147746396776905/?type=2&theater, posted Dec. 14, 2020, accessed Feb. 25, 2021.

*Primary Examiner* — Navid Z. Mehdizadeh
*Assistant Examiner* — Caitlin R Mccleary
(74) *Attorney, Agent, or Firm* — Foley & Lardner LLP

(57) ABSTRACT

A refuse vehicle includes a chassis, a body, a cab, a lift assembly coupled to the chassis and/or the body, and a control system. The lift assembly includes a first arm, a second arm, an implement coupled to the first arm and the second arm, and an actuator positioned to pivot the first arm and the second arm to facilitate repositioning the implement between a plurality of positions. The control system is configured to (i) control a user interface to provide an indication of a current position of the lift assembly, (ii) automatically reposition the lift assembly without requiring operator intervention to accommodate a low clearance environment, and/or (iii) limit a speed of the refuse vehicle in response to the current position not being a transit position.

18 Claims, 6 Drawing Sheets

(56) References Cited

U.S. PATENT DOCUMENTS 10,859,167 B2 12/2020 Jax et al.
11,001,135 B2 5/2021 Yakes et al.
11,001,440 B2 5/2021 Rocholl et al.
11,007,863 B2 5/2021 Yakes et al.
11,021,078 B2 6/2021 Rocholl et al.
11,046,329 B2 6/2021 Clifton et al.
11,059,436 B2 7/2021 Wildgrube et al.
11,097,617 B2 8/2021 Rocholl et al.
11,137,002 B2 10/2021 Clifton et al.
11,148,550 B2 10/2021 Rocholl et al.
11,148,880 B1 10/2021 Koga et al.
11,254,499 B2 2/2022 Rocholl et al.
11,254,500 B2 2/2022 Buege et al.
11,273,978 B2 3/2022 Buege et al.
11,295,102 B2 4/2022 Kappers et al.
11,338,995 B2 5/2022 Rocholl et al.
11,414,267 B2 8/2022 Rocholl et al.
11,434,681 B2 9/2022 Rocholl et al.
11,442,556 B2 9/2022 Clifton et al.
11,447,334 B2 9/2022 Buege et al.
11,454,326 B2 9/2022 Jax et al.
11,465,838 B2 10/2022 Koga et al.
11,505,084 B2 11/2022 Koga et al.
11,505,403 B2 11/2022 Rocholl et al.
11,505,404 B2 11/2022 Rocholl et al.
11,535,308 B2 12/2022 Schwartz et al.
11,537,136 B2 12/2022 Clifton et al.
11,538,291 B2 12/2022 Rocholl et al.
11,551,534 B2 1/2023 Rocholl et al.
11,597,297 B2 3/2023 Rocholl et al.
2003/0130765 A1* 7/2003 Pillar .................... G05B 19/00 701/1
2010/0057358 A1* 3/2010 Winer ................ G01C 21/3667 701/414
2014/0110168 A1* 4/2014 Pursimo .................. E21B 7/025 701/50
2017/0072764 A1* 3/2017 Kleve ................ G01C 21/3811
2017/0349374 A1 12/2017 Haddick et al.
2018/0265289 A1 9/2018 Davis et al.
2019/0193934 A1 6/2019 Rocholl et al.
2019/0218032 A1* 7/2019 Whitfield, Jr. .......... B65F 3/041
2019/0322321 A1 10/2019 Schwartz et al.
2020/0090562 A1* 3/2020 DeLorean ............... G09F 19/22
2020/0156658 A1* 5/2020 Borhan .............. G01C 21/3492
2020/0247609 A1* 8/2020 Maroney ................... B65F 3/02
2020/0262366 A1 8/2020 Wildgrube et al.
2020/0339346 A1* 10/2020 Maroney ................. B65F 3/041
2020/0346547 A1 11/2020 Rocholl et al.
2020/0346556 A1 11/2020 Rocholl et al.
2020/0346657 A1 11/2020 Clifton et al.
2020/0346861 A1 11/2020 Rocholl et al.
2020/0346862 A1 11/2020 Rocholl et al.
2020/0347661 A1 11/2020 Rocholl et al.
2021/0069934 A1 3/2021 Rocholl et al.
2021/0131075 A1* 5/2021 Kumakura .............. E02F 9/264
2021/0139303 A1 5/2021 Rosencrance et al.
2021/0221216 A1 7/2021 Yakes et al.
2021/0223772 A1* 7/2021 Penmetsa ............. G05D 1/0223
2021/0229908 A1 7/2021 Rocholl et al.
2021/0252995 A1 8/2021 Rocholl et al.
2021/0316740 A1 10/2021 Clifton et al.
2021/0316741 A1 10/2021 Clifton et al.
2021/0323436 A1 10/2021 Rocholl et al.
2021/0323437 A1 10/2021 Rocholl et al.
2021/0323438 A1 10/2021 Rocholl et al.
2021/0323764 A1 10/2021 Koga et al.
2021/0324880 A1 10/2021 Wente et al.
2021/0325529 A1 10/2021 Koga et al.
2021/0325911 A1 10/2021 Koga et al.
2021/0327164 A1 10/2021 Koga et al.
2021/0331635 A1 10/2021 Wildgrube et al.
2021/0331636 A1 10/2021 Wildgrube et al.
2021/0331637 A1 10/2021 Wildgrube et al.
2021/0339632 A1 11/2021 Rocholl et al.
2021/0339949 A1 11/2021 Rocholl et al.
2021/0345062 A1 11/2021 Koga et al.
2021/0373560 A1 12/2021 Koga et al.
2021/0396251 A1 12/2021 Clifton et al.
2022/0009338 A1 1/2022 Yakes et al.
2022/0033181 A1 2/2022 Koga et al.
2022/0096884 A1 3/2022 Koga et al.
2022/0097527 A1 3/2022 Koga et al.
2022/0097555 A1 3/2022 Koga et al.
2022/0097556 A1 3/2022 Koga et al.
2022/0097633 A1 3/2022 Koga et al.
2022/0097961 A1 3/2022 Koga et al.
2022/0097962 A1 3/2022 Koga et al.
2022/0097963 A1 3/2022 Koga et al.
2022/0097964 A1 3/2022 Koga et al.
2022/0099723 A1 3/2022 Koga et al.
2022/0105827 A1 4/2022 Rocholl et al.
2022/0106114 A1 4/2022 Buege et al.
2022/0106115 A1 4/2022 Buege et al.
2022/0118854 A1 4/2022 Davis et al.
2022/0156474 A1 5/2022 Kappers et al.
2022/0161854 A1 5/2022 Mortenson et al.
2022/0161997 A1 5/2022 Mortenson et al.
2022/0219896 A1 7/2022 Gary et al.
2022/0258967 A1 8/2022 Kappers et al.

* cited by examiner

LIFT ARM ASSEMBLY FOR A FRONT END LOADING REFUSE VEHICLE

CROSS-REFERENCE TO RELATED PATENT APPLICATION

This application claims the benefit of and priority to U.S. Provisional Patent Application No. 63/150,370, filed Feb. 17, 2021, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis, a body coupled to the chassis, a cab coupled to the chassis and positioned in front of the body, a lift assembly coupled to at least one of the chassis or the body, and a control system. The lift assembly includes a first arm, a second arm, an implement coupled to the first arm and the second arm, and an actuator positioned to pivot the first arm and the second arm to facilitate repositioning the implement between a plurality of positions including a stowed position where the implement is positioned above the body, a working position where the implement is positioned in front of the cab, and a transit position between the stowed position and the working position. The control system is configured to at least one of (i) control a user interface to provide an indication of a current position of the lift assembly, (ii) automatically reposition the lift assembly without requiring operator intervention to accommodate a low clearance environment, or (iii) limit a speed of the refuse vehicle in response to the current position not being the transit position.

Another embodiment relates to a refuse vehicle. The refuse vehicle includes a chassis, a body coupled to the chassis, a cab coupled to the chassis and positioned in front of the body, a lift assembly coupled to at least one of the chassis or the body, and a control system. The lift assembly includes a first arm, a second arm, an implement coupled to the first arm and the second arm, and an actuator positioned to pivot the first arm and the second arm to facilitate repositioning the lift assembly between a plurality of positions. The control system is configured to acquire environment data regarding an environment proximate or ahead of the vehicle, acquire position data regarding a current position of the lift assembly, identify a low clearance environment based on the environment data, and automatically reposition the lift assembly based on the low clearance environment in response to the position data indicating that the lift assembly needs to be repositioned to accommodate the low clearance environment.

Still another embodiment relates to a refuse vehicle. The refuse vehicle includes a chassis, a body coupled to the chassis, a cab coupled to the chassis and positioned in front of the body, a lift assembly coupled to at least one of the chassis or the body, a user interface, and a control system. The lift assembly includes a first arm, a second arm, an implement coupled to the first arm and the second arm, and an actuator positioned to pivot the first arm and the second arm to facilitate repositioning the implement between a plurality of positions including a stowed position where the implement is positioned above the body, a working position where the implement is positioned in front of the cab, and a transit position between the stowed position and the working position. The control system is configured to control the user interface to (a) provide (i) a first visual indication indicating a current position of the lift assembly and (ii) a second visual indication indicating a current maximum height of the lift assembly at the current position, (b) in response to a speed threshold being reached while the lift assembly is not in the transit position, (i) limit a speed of the refuse vehicle and (ii) provide a notification via the user interface requesting operator approval to reposition the lift assembly to the transit position to permit further acceleration, and (c) automatically reposition the lift assembly without requiring operator intervention to accommodate a low clearance environment.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle (e.g., a front end loading refuse vehicle, a refuse truck, etc.) includes a lift arm assembly (e.g., an extendable lift arm assembly, a telescoping lift arm assembly, etc.) and a control system. The lift arm assembly is repositionable between a plurality of positions including a stowed position, a working position, and a transit position. The control system is configured to monitor the speed of the refuse vehicle, a current position of the lift arm assembly, and/or the surrounding or upcoming environment around the refuse vehicle. In some embodiments, the control system is configured to control a user interface (e.g., a display, a series of lights, etc.) of the refuse vehicle to provide an indication of a current position of the lift arm assembly. In some embodiments, the control system is additionally or alternatively configured to automatically reposition the lift arm assembly without requiring operator intervention to accommodate a low clearance environment (e.g., if the lift arm assembly is currently in a position that cannot accommodate the low clearance environment, etc.). In some embodiments, the control system is additionally or alternatively configured to limit a speed of the refuse vehicle in response to the current position of the lift arm assembly not being the transit position.

Figure 1:
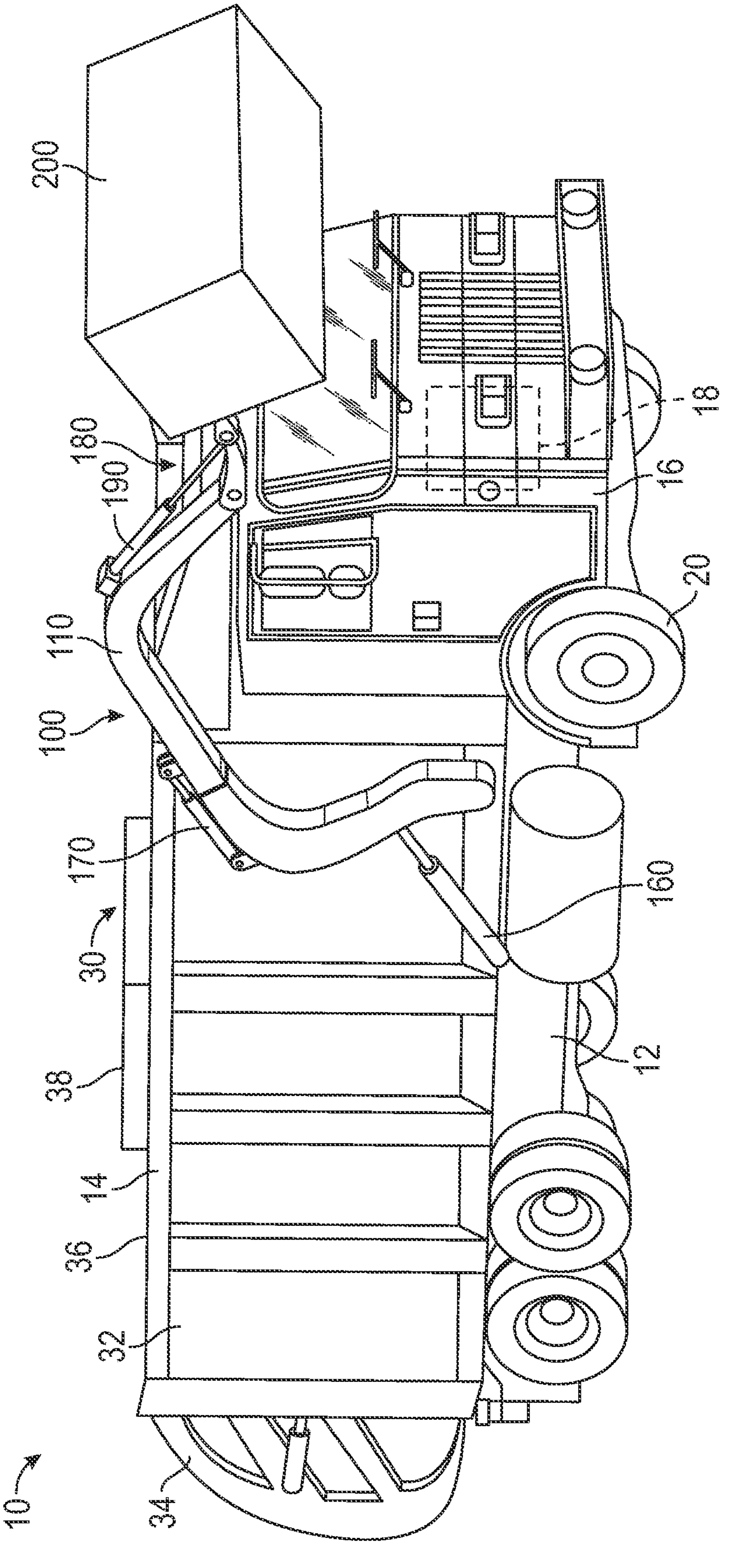
FIG. 1 is a perspective view of a refuse vehicle, according to an exemplary embodiment.

According to the exemplary embodiment shown in FIGS. 1-4, a front end loader, shown as refuse vehicle 10 (e.g., a garbage truck, a waste collection truck, a sanitation truck, etc.), is configured as a front-loading refuse truck having an extendable lift arm assembly, shown as telescoping lift arm assembly 100. In other embodiments, the refuse vehicle 10 is configured as a side-loading refuse truck or a rear-loading refuse truck. In still other embodiments, the front end loader is another type of vehicle (e.g., a skid-loader, a telehandler, a plow truck, a boom lift, a construction vehicle, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover, shown as engine 18, coupled to the frame 12 at a position beneath the cab 16. The engine 18 is configured to provide power to a plurality of tractive elements, shown as wheel and tire assemblies 20, and/or to other systems of the refuse vehicle 10 (e.g., a pneumatic system, a hydraulic system, etc.). In other embodiments, the tractive elements include track elements. The engine 18 may be configured to utilize one or more of a variety of fuels (e.g., gasoline, diesel, bio-diesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine driven generator, etc.), and/or from an external power source (e.g., overhead power lines, a charger, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of and/or above the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position of the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIGS. 1-4, the telescoping lift arm assembly 100 includes a first lift arm, shown as right lift arm 110, coupled to a first side of the body 14 and/or the frame 12, and a second lift arm, shown as left lift arm 112, coupled to an opposing second side of the body 14 and/or the frame 12 such that the right lift arm 110 and the left lift arm 112 extend forward of the cab 16 (e.g., a front-loading refuse vehicle, etc.). In other embodiments, the telescoping lift arm assembly 100 extends rearward of the body 14 (e.g., a rear-loading refuse vehicle, etc.). In still other embodiments, the telescoping lift arm assembly 100 extends from a side of the body 14 (e.g., a side-loading refuse vehicle, etc.). It should be noted that the description of the left lift arm 112 provided herein with regards to FIGS. 2-4 similarly applies to the right lift arm 110.

Figure 2:
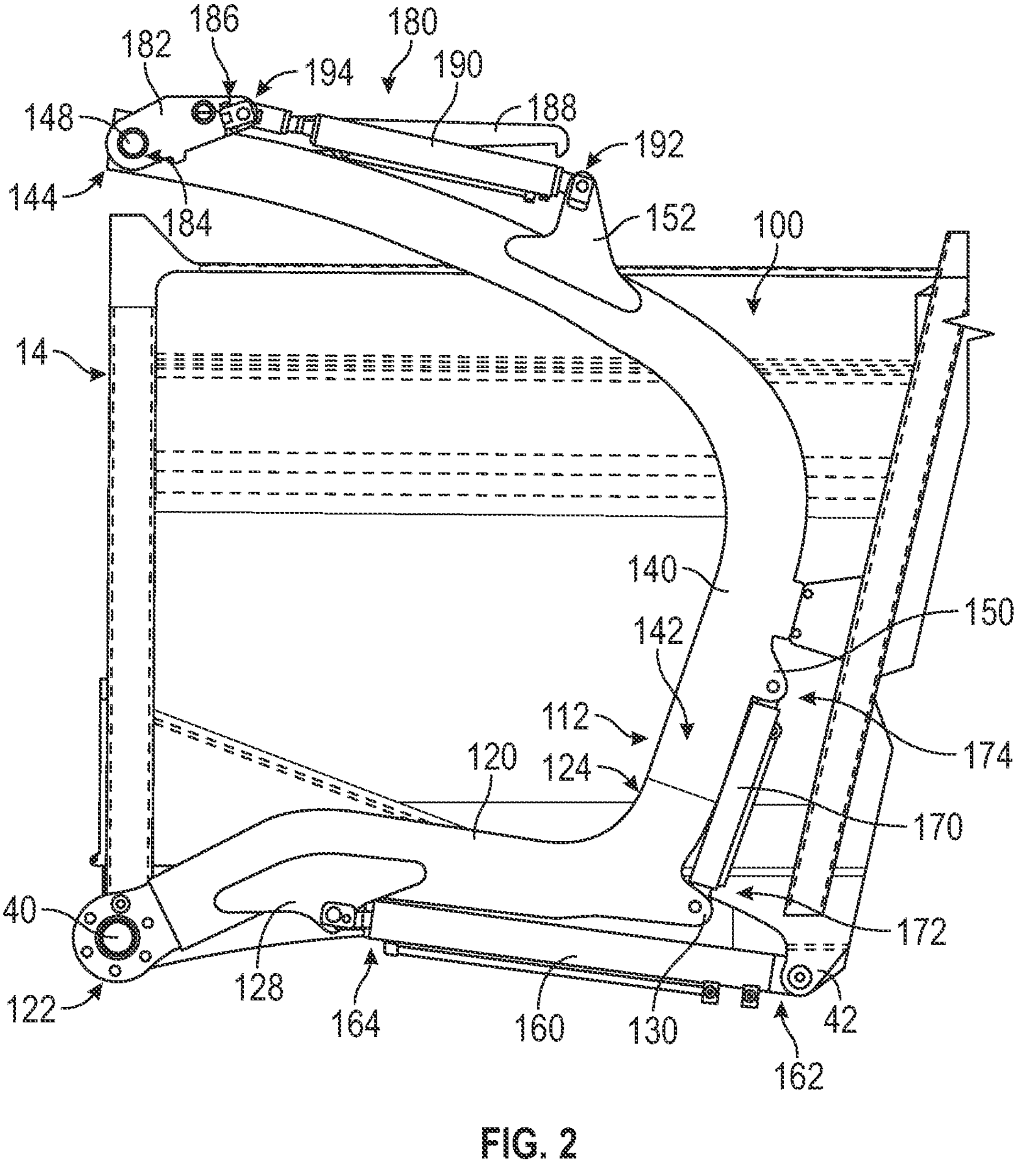
FIG. 2 is side view of an extendable lift arm assembly in a stowed position, according to an exemplary embodiment.
Figure 3:
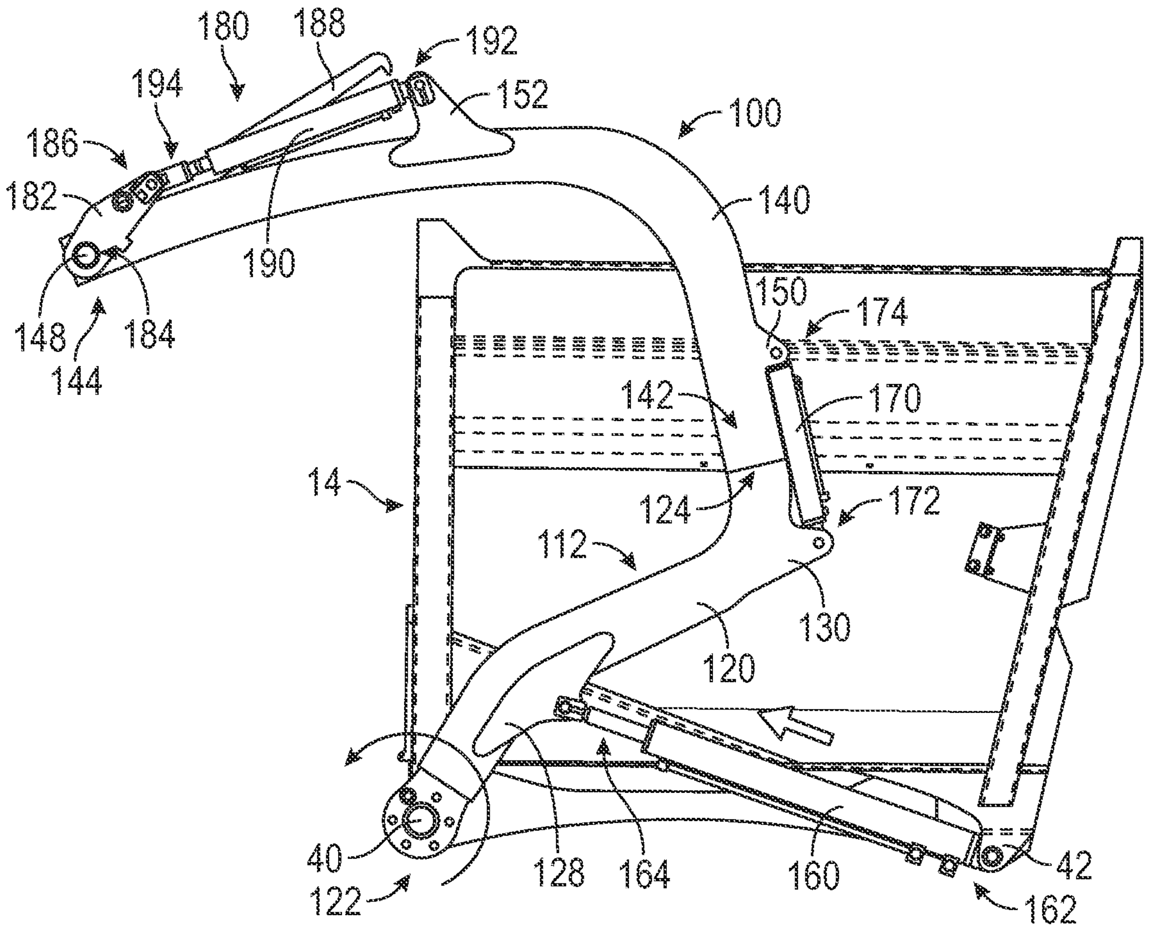
FIG. 3 is a side view of the extendable lift arm assembly of FIG. 2 in an intermediate position, according to an exemplary embodiment.
Figure 4:
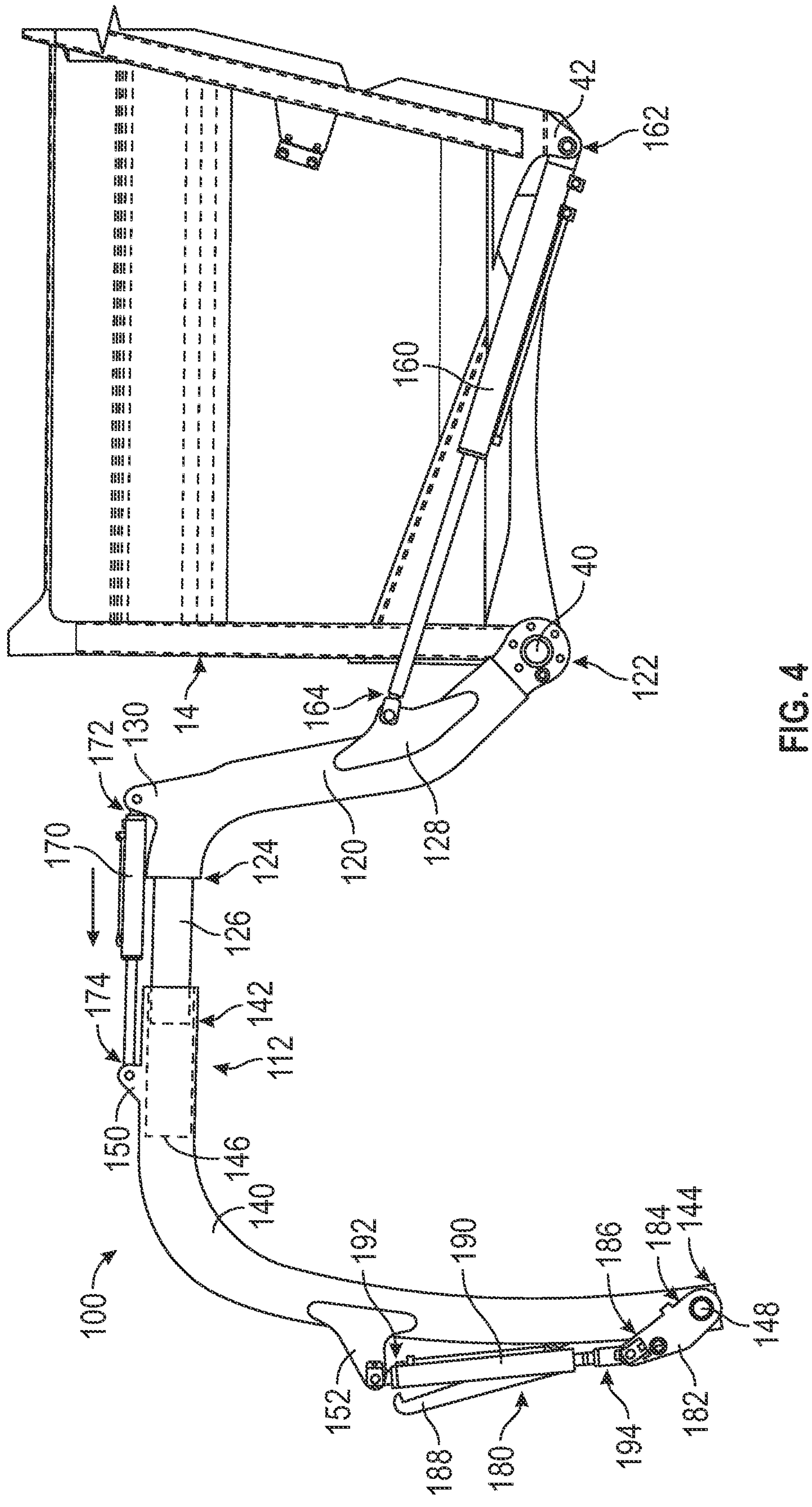
FIG. 4 is a side view of the extendable lift arm assembly of FIG. 2 in a working position, according to an exemplary embodiment.

As shown in FIGS. 2-4, the left lift arm 112 (and similarly the right lift arm 110) has a plurality of arm portions including at least a first arm portion, shown as first arm portion 120, and a second arm portion, shown as second arm portion 140. In some embodiments, the plurality of arm portions include three or more arm portions (e.g., that are extendable, pivotable, or otherwise repositionable relative to each other at multiple locations/joints therealong, etc.). The first arm portion 120 has a first end, shown as first end 122, pivotally coupled to a side (e.g., the left side, the right side, etc.) of the body 14 and/or the frame 12 at a first pivot point, shown as lift arm pivot 40, and an opposing second end, shown as second end 124. As show in FIG. 4, the second end 124 has a protrusion, shown as projection 126, extending therefrom. As shown in FIGS. 2-4, the first arm portion 120 includes (i) a first coupler, shown as first bracket 128, coupled along the first arm portion 120 between the first end 122 and the second end 124 (e.g., closer to the first end 122, proximate the first end 122, etc.), and (ii) a second coupler, shown as first flange 130, extending from the first arm portion 120, proximate the second end 124.

As shown in FIGS. 2-4, the second arm portion 140 has a first end, shown as first end 142, and an opposing second end, shown as second end 144. As show in FIG. 4, the first end 142 defines a cavity, shown as extension cavity 146, positioned to slidably receive the projection 126 of the first arm portion 120 (e.g., forming a telescoping assembly, etc.). In other embodiments, the second end 124 of the first arm portion 120 defines the extension cavity 146 and the first end 142 of the second arm portion 140 has the projection 126. As shown in FIGS. 2-4, the second arm portion 140 includes (i) a third coupler, shown as second flange 150, extending from the second arm portion 140, proximate the first end 142, and (ii) a fourth coupler, shown as second bracket 152, coupled along the second arm portion 140 between the first end 142 and the second end 144.

In an alternative embodiment, the left lift arm 112 and the right lift arm 114 do not include the projection 126 or the extension cavity 146. In such an embodiment, the first arm portion 120 and the second arm portion 140 may be stacked (e.g., in a side-by-side arrangement, in a top-and-bottom arrangement, etc.) where the first end 142 of the second arm portion 140 over-retracts beyond the second end 124 of the first arm portion 120 and slides or translates therealong. The first arm portion 120 and the second arm portion 140 may be coupled together using a sliding or track mechanism (e.g., a slide assembly, a track assembly, etc.). In some embodiments, the second end 124 of the first arm portion 120 is positioned on the inside of the second arm portion 140. In some embodiments, the second end 124 of the first arm portion 120 is positioned on the outside of the first end 142 of the second arm portion 140. In some embodiments, the second end 124 of the first arm portion 120 is positioned on top of the first end 142 of the second arm portion 140. In some embodiments, the second end 124 of the first arm portion 120 is positioned below the first end 142 of the second arm portion 140.

As shown in FIGS. 1-4, the telescoping lift arm assembly 100 includes a pair of first actuators (e.g., hydraulic cylinders, pneumatic actuators, electric actuators, etc.), shown as pivot actuators 160, a pair of second actuators (e.g., hydraulic cylinders, pneumatic actuators, electric actuators, etc.), shown as extension actuators 170, an implement, shown as fork assembly 180, and a pair of third actuators (e.g., hydraulic cylinders, pneumatic actuators, electric actuators, etc.), shown as implement actuators 190. As shown in FIGS. 2-4, each of the pivot actuators 160 includes a first end, shown as first end 162, pivotally coupled to a side of the body 14 and/or the frame 12 at a second pivot point, shown as pivot actuator pivot 42, and an opposing second end, shown as second end 164, coupled to the first bracket 128 of the first arm portion 120. According to an exemplary embodiment, the pivot actuators 160 are positioned such that extension and retraction thereof pivots the right lift arm 110 and the left lift arm 112 about the lift arm pivot 40 between (i) a stowed or dumping position, as shown in FIG. 2, (ii) a working position, as shown in FIG. 4, and (iii) a transit position, as shown in FIG. 3. According to an exemplary embodiment, the transit position is a position between the stowed position and the working position that (i) provides greater operator visibility in front of the refuse vehicle 10 from the cab 16 relative to the working position and (ii) provides increased over-height clearance relative to the stowed position.

As shown in FIGS. 2-4, each of the extension actuators 170 includes a first end, shown as first end 172, coupled to the first flange 130 of the first arm portion 120, and an opposing second end, shown as second end 174, coupled to the second flange 150 of the second arm portion 140. In another embodiment, one or both of the extension actuators 170 include a rotatory actuator (e.g., an electric stepper motor, a hydraulic motor, etc.) and a translator. The translator may be a rack (e.g., such that the extension actuator 170 is a rack and pinion device, etc.), a cable, a chain, a bar, etc. According to the exemplary embodiment shown in FIGS. 1-4, the extension actuators 170 are positioned externally relative to the right lift arm 110 and the left lift arm 112 and extend between the second end 124 of the first arm portion 120 and the first end 142 of the second arm portion 140. In other embodiments, the extension actuators 170 are positioned internally within the right lift arm 110 and the left lift arm 112 and extend between the second end 124 of the first arm portion 120 and the first end 142 of the second arm portion 140. According to an exemplary embodiment, the extension actuators 170 are positioned such that extension and retraction thereof repositions (e.g., extends, retracts, etc.) the second arm portion 140 relative to the first arm portion 120 between a retracted position, as shown in FIGS. 2 and 3, and an extended position, as shown in FIG. 4. According to an exemplary embodiment, retracting the extension actuators 170 provides increased clearance when the telescoping lift arm assembly 100 is in the stowed position and increased reach when the telescoping lift arm assembly 100 is in the working position.

In some embodiments, the extension actuators 170 are configured to extend (e.g., automatically, etc.) in response to the pivot actuators 160 pivoting the right lift arm 110 and the left lift arm 112. By way of example, the extension actuators 170 may be configured to automatically extend based on a position of the telescoping lift arm assembly 100 relative to the cab 16 and/or the frame 12. For example, the extension actuators 170 may be configured to automatically extend as the fork assembly 180 reaches a position where the fork assembly 180 becomes close to the cab 16 (e.g., an upper trailing edge thereof, an upper leading edge thereof, etc.) as the telescoping lift arm assembly 100 is pivoted between the stowed position and the working position (e.g., to prevent the fork assembly 180 from hitting the cab 16, etc.). The extension actuators 170 may thereafter be configured to automatically retract after the cab 16 (e.g., the upper trailing edge thereof, the upper leading edge thereof, etc.) is cleared to reduce the overall envelope of the refuse vehicle 10. Accordingly, the telescoping lift arm assembly 100 facilitates using smaller lift arms on vehicles with large cabs without an issue (i.e., due to the extendibility provided by the telescoping lift arm assembly 100).

As shown in FIGS. 2-4, the fork assembly 180 includes a pair of pivotal couplers, shown as fork brackets 182, and a pair of forks, shown as forks 188, coupled to the fork brackets 182. According to an exemplary embodiment, one of the fork brackets 182 is coupled to a respective one of the right lift arm 110 and the left lift arm 112. The forks 188 are rotationally fixed with the fork brackets 182 (e.g., pivotal movement of the fork brackets 182 causes the forks 188 to pivot therewith, etc.), according to an exemplary embodiment. As shown in FIGS. 2-4, each of the fork brackets 182 includes (i) a first coupling point, shown as first coupling point 184, pivotally coupled to the second end 144 of the second arm portion 140 at a third pivot point, shown as fork assembly pivot 148, and (ii) a second coupling point, shown as second coupling point 186. Each of the implement actuators 190 includes a first end, shown as first end 192, coupled to the second bracket 152 of the second arm portion 140 and an opposing second end, shown as second end 194, coupled to the second coupling point 186 of the fork brackets 182. According to an exemplary embodiment, the implement actuators 190 are positioned such that extension and retraction thereof pivots the fork brackets 182 and thereby the forks 188 about the fork assembly pivot 148 between a stowed position, as shown in FIGS. 2-4, and a working position, as shown in FIG. 1. In other embodiments, the fork assembly 180 is replaced or replaceable with a plow attachment; a quick attach assembly that is the same or similar to what is disclosed in U.S. Patent Publication No. 2017/0349374, filed May 31, 2017, which is incorporated herein by reference in its entirety; and/or still another type of implement useable with the telescoping lift arm assembly 100.

As shown in FIG. 1, the telescoping lift arm assembly 100 is configured to engage with a container, shown as refuse container 200. By way of example, the refuse vehicle 10 may be driven up to a refuse pick-up location. The pivot actuators 160 may then be engaged to pivot the right lift arm 110 and the left lift arm 112 from the stowed position to the working position, as well as the implement actuators 190 may be engaged to pivot the forks 188 from the stowed position to the working position. The refuse container 200 may thereafter be retrieved from its storage location and brought proximate the telescoping lift arm assembly 100 or the refuse vehicle 10 may be driven up to the refuse container 200 such that the forks 188 align with fork tubes on the refuse container 200. A traditional refuse vehicle includes non-extendable lift arms and, therefore, in order to bring forks of the non-extending lift arms into engagement with fork tubes of a refuse container, the refuse vehicle has to be driven forward such that the forks are received by the fork tubes. The extendibility of the telescoping lift arm assembly 100 eliminates such a need to drive the refuse vehicle 10 forward to bring the forks 188 into engagement with the fork tubes of the refuse container 200. For example, once the fork tubes of the refuse container 200 are in alignment with the forks 188, the extension actuators 170 may be extended such that the second arm portions 140 extend from the first arm portions 120, bringing the forks 188 into engagement with the fork tubes of the refuse container 200. Engaging the forks 188 with the extension actuators 170 rather than by driving the refuse vehicle 10 forward may provide increased control, provide the ability to access refuse containers 200 in tighter spaces, and/or provide still other advantages.

The pivot actuators 160 may thereafter be engaged to lift the refuse container 200 over the cab 16. According to an exemplary embodiment, the implement actuators 190 are positioned to articulate the forks 188, where such articulation may assist in tipping refuse out of the refuse container 200 and into the hopper volume of the refuse compartment 30 through an opening in the cover 36. According to an exemplary embodiment, a door, shown as top door 38, is movably coupled along the cover 36 to seal the opening, thereby preventing refuse from escaping the refuse compartment 30 (e.g., due to wind, bumps in the road, etc.). The pivot actuators 160 may thereafter be engaged to pivot the right lift arm 110 and the left lift arm 112 to return the empty refuse container 200 to the ground. The extension actuators 170 may then be engaged to retract the forks 188 from the fork tubes of the refuse container 200 (e.g., without having to drive the refuse vehicle 10 in reverse, etc.).

Figure 5:
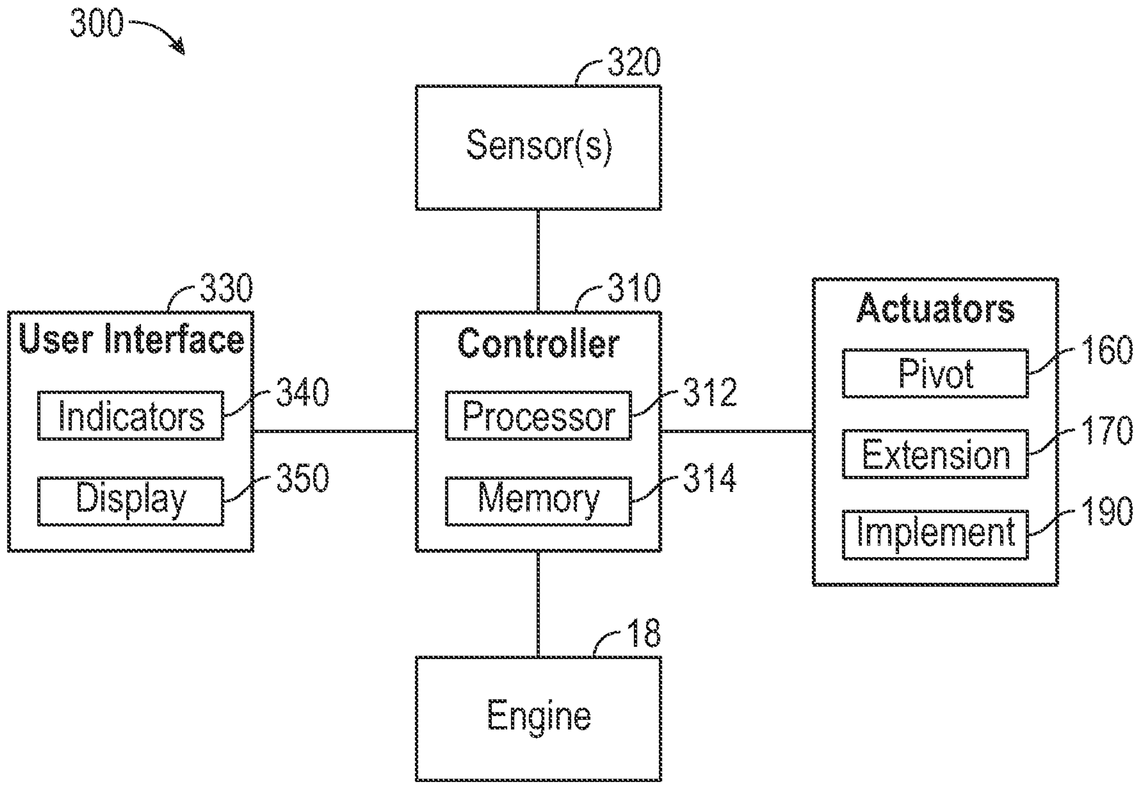
FIG. 5 is a schematic diagram of a control system of the refuse vehicle of FIG. 1, according to an exemplary embodiment.

According to the exemplary embodiment shown in FIG. 5, a control system 300 for the refuse vehicle 10 includes a controller 310. In one embodiment, the controller 310 is configured to selectively engage, selectively disengage, control, or otherwise communicate with components of the refuse vehicle 10. As shown in FIG. 5, the controller 310 is coupled to (e.g., communicably coupled to) components of the refuse vehicle 10 including the engine 18, the pivot actuators 160, the extension actuators 170, the implement actuators 190, one or more sensors, shown as sensors 320, and a user input/output device, shown as user interface 330. By way of example, the controller 310 may send and receive signals (e.g., control signals) with the engine 18, the pivot actuators 160, the extension actuators 170, the implement actuators 190, the sensors 320, and/or the user interface 330.

The controller 310 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 5, the controller 310 includes a processing circuit 312 and a memory 314. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, the controller 310 may represent a collection of processing devices (e.g., servers, data centers, etc.). In such cases, the processing circuit 312 represents the collective processors of the devices, and the memory 314 represents the collective storage devices of the devices.

In some embodiments, the sensors 320 are or include one or more position sensors configured to acquire position data regarding the position one or more components of the telescoping lift arm assembly 100. By way of example, the position sensors may be configured to acquire position data regarding an amount of extension or retraction of the pivot actuators 160, the extension actuators 170, and/or the implement actuators 190. By way of another example, the position sensors may be additionally or alternatively configured to acquire position data regarding an amount of rotation of the telescoping lift arm assembly 100 about the lift arm pivot 40.

In some embodiments, the sensors 320 are or include one or more environment sensors configured to acquire environment data regarding an environment proximate or ahead of the refuse vehicle 10. By way of example, a first environment sensor may be or include a camera, an optical sensor, a proximity sensor/detector, and/or still another suitable sensor configured to acquire environment data regarding the position of external objects and/or the position or proximity of the telescoping lift arm assembly 100 to the external objects (e.g., an overpass, a roof or overhang, a low clearance area/environment, a garage, a parking structure, etc.). By way of another example, a second environment sensor may be or include a GPS sensor, a telematics sensor, etc. configured to acquire environment data regarding environmental characteristics (e.g., upcoming overpasses, upcoming low clearance areas/environments, etc.) proximate or ahead of the refuse vehicle 10 from a remote source (e.g., a GPS system, a telematics server, etc.).

In some embodiments, the sensors 320 are or include one or more speed sensors configured to acquire speed data regarding a speed of the engine 18 and/or the refuse vehicle 10. In some embodiments, the sensors 320 are or include one or more mode detection sensors configured to acquire mode selection or condition data regarding a current operation mode or condition of the refuse vehicle 10.

According to an exemplary embodiment, the controller 310 is configured to control the engine 18, the pivot actuators 160, the extension actuators 170, the implement actuators 190, and/or the user interface 330 based on the data (e.g., the position data, the environment data, the speed data, the mode selection or condition data, etc.) acquired from the sensors 320. In some embodiments, the controller 310 is configured to monitor a current position of the telescoping lift arm assembly 100 and/or one or more components thereof (e.g., the stowed position, the working position, the transit position, etc.) based on the position data acquired from the sensors 320 and provide a visual indication of the current position of the telescoping lift arm assembly 100 to the operator via the user interface 330.

Figure 6:
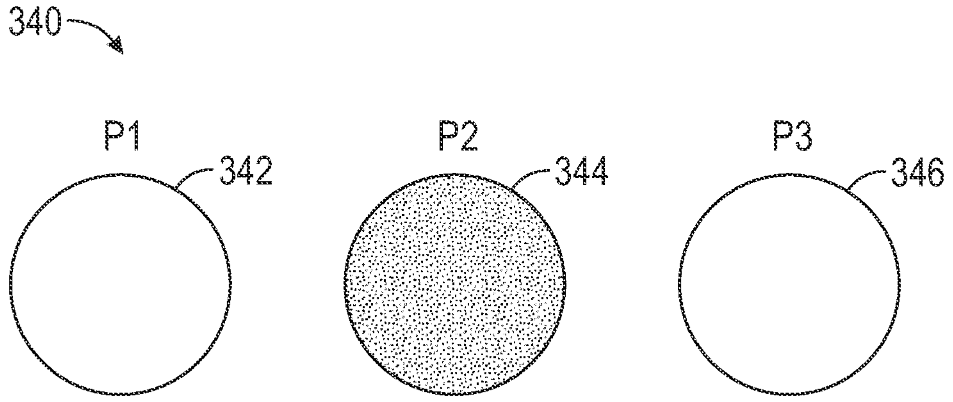
FIG. 6 is a graphical representation of a user interface including a plurality of indicators that facilitate displaying a position of a lift assembly of the refuse vehicle of FIG. 1, according to an exemplary embodiment.
Figure 7:
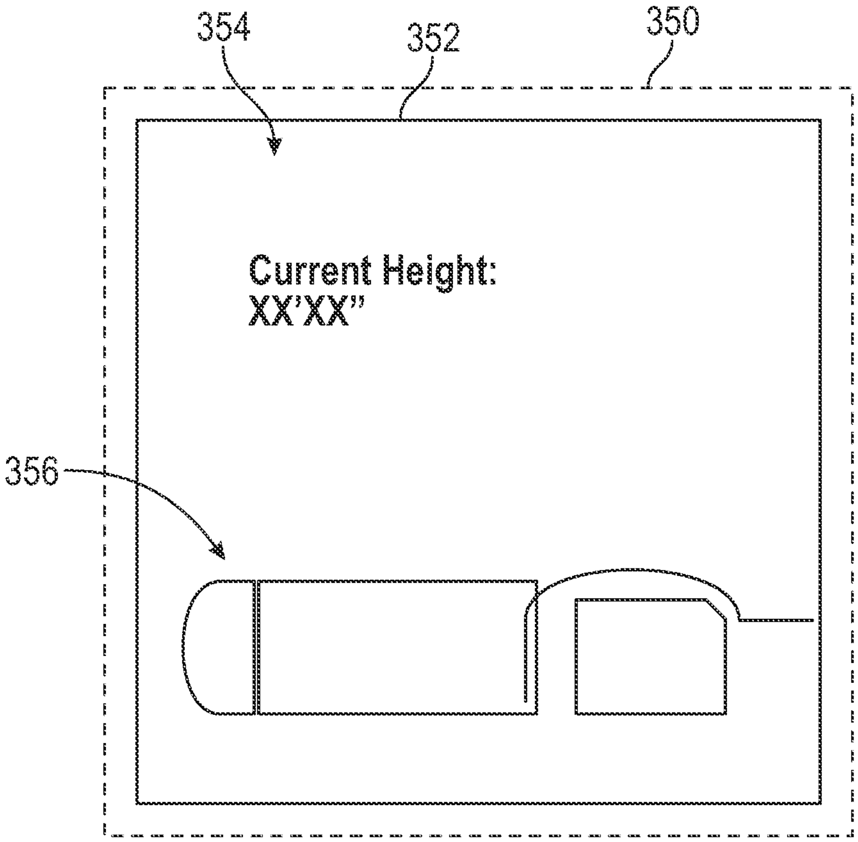
FIG. 7 is a graphical representation of a display providing a graphical user interface displaying a position of a lift assembly of the refuse vehicle of FIG. 1, according to an exemplary embodiment.

As shown in FIGS. 5-7, the user interface 330 includes a first output or set of indicators, shown as indicators 340, and/or a second output or display device, shown as display 350. As shown in FIG. 6, the indicators 340 include a first indicator, shown as indicator 342, a second indicator, shown as indicator 344, and a third indicator, shown as indicator 346. According to an exemplary embodiment, the indicator 342 is associated with a first position or the stowed position of the telescoping lift arm assembly 100, the indicator 344 is associated with a second position or the transit position of the telescoping lift arm assembly 100, and the indicator 346 is associated with a third position or the working position of the telescoping lift arm assembly 100. In other embodiments, the indicators 340 include a different number of indicators to provide increased granularity regarding additional positions of the telescoping lift arm assembly 100 (i.e., positions between the stowed position, the working position, and the transit position). According to an exemplary embodiment, the indicators 340 are or include lighting elements (e.g., lights, light bulbs, LEDs, etc.). According to an exemplary embodiment, the controller 310 is configured to illuminate, flash, change the color of, or otherwise activate the indicators 340 to provide the visual indication of the current position of the telescoping lift arm assembly 100 to the operator. In some embodiments, the indicators 340 function as inputs (e.g., buttons, etc.) that allow the operator to manually provide a command to the controller 310 to control the actuators of the telescoping lift arm assembly 100 to reposition the telescoping lift arm assembly 100 to the position associated with the selected indicator 340. By way of example, the operator may select the indicator 344 and the controller 310 may be configured to control the actuators of the telescoping lift arm assembly 100 to move the telescoping lift arm assembly 100 to the second or transit position.

As shown in FIG. 7, the controller 310 is configured to control the display 350 to display a position graphical user interface ("GUI"), shown as position GUI 352, to provide the visual indication of the current position of the telescoping lift arm assembly 100 to the operator. The position GUI 352 includes a first section, shown as current height indicator 354, and a second section, shown as current position indicator 356. According to an exemplary embodiment, the controller 310 is configured to populate, adjust, update, etc. the current height indicator 354 and/or the current position indicator 356 based on the position data. The current height indicator 354 facilitates providing a visual indication of a current maximum height of the telescoping lift arm assembly 100 to the operator. Such information may be used by the operator to manually manipulate the position of the telescoping lift arm assembly 100 as the refuse vehicle 10 approaches height restricted or low clearance areas/environment (e.g., an overpass, a roof or overhang, a garage, a packing structure, etc.). The current position indicator 356 facilitates providing a visual indication of the current position of the telescoping lift arm assembly 100 (e.g., the stowed position; the working position; the transit position; positions between the stowed position, the working position, and the transit position; etc.). In some embodiments, the position GUI 352 displays various selectable buttons or tiles (e.g., a stowed button/tile, a transit button/tile, a working button/tile, etc.) that allow the operator to manually provide a command to the controller 310 to control the actuators of the telescoping lift arm assembly 100 to reposition the telescoping lift arm assembly 100 to the positioned associated with the selected button or tile. By way of example, the operator may select a respective button or tile and the controller 310 may be configured to control the actuators of the telescoping lift arm assembly 100 to move the telescoping lift arm assembly 100 to the position associated therewith.

In some embodiments, the controller 310 is configured to control the actuators of the telescoping lift arm assembly 100 to automatically adjust the position of the telescoping lift arm assembly 100 (e.g., while the mode or condition data indicates the refuse vehicle 10 is in a transit mode or condition, etc.) based on the environment data and/or the position data acquired from the sensors 320 to avoid upcoming or proximate external objects. According to an exemplary embodiment, the controller 310 is configured to automatically reduce the current height of the telescoping lift arm assembly 100 to accommodate low clearance areas/environments while maintaining sufficient visibility for the operator from the cab 16 ahead of the refuse vehicle 10 (e.g., the controller 310 will not substantially block or obstruct the view of the operator, etc.). In some embodiments, the controller 310 is configured to provide an adjustment indication (e.g., a notification, an alert, a warning, etc.) via the user interface 330 (i) requesting that the operator approve the automatic adjustment or (ii) indicating that the operator should consider manually repositioning the telescoping lift arm assembly 100 to avoid upcoming or proximate external objects based on the environment data and/or the position data. In some embodiments, the controller 310 is configured to prevent the operator from manually adjusting the position the telescoping lift arm assembly 100 beyond a certain position to prevent the telescoping lift arm assembly 100 from inadvertently engaging with an external object (e.g., in a low clearance environment, etc.).

By way of example, the controller 310 may be configured to (i) acquire the environment data from the first environment sensor (e.g., a camera, an optical sensor, a proximity sensor/detector, etc.) and/or the position data from the position sensors (the position data may not be necessary depending on whether the first environment sensor acquires data regarding proximity of the telescoping lift arm assembly 100 to external objects) and (ii) control the actuators of the telescoping lift arm assembly 100 based on the environment data and/or the position data to automatically reposition the telescoping lift arm assembly 100 without requiring manual operator interaction or intervention such that the telescoping lift arm assembly 100 does not engage with surrounding external objects (e.g., so that the current height of the telescoping lift arm assembly 100 is under height for an upcoming overpass, bridge, entryway, garage, etc.). By way of another example, the controller 310 may be configured to (i) acquire the environment data from the second environment sensor (e.g., a GPS sensor, a telematics sensor, etc.) and the position data from the position sensors and (ii) control the actuators of the telescoping lift arm assembly 100 based on the environment data and the position data to automatically reposition the telescoping lift arm assembly 100 without requiring manual operator interaction or intervention such that the telescoping lift arm assembly 100 does not engage with surrounding external objects.

In some embodiments, the controller 310 is configured to control the speed of the engine 18 and/or the refuse vehicle 10 based on the speed data and/or the position data. By way of example, the controller 310 may be configured to limit the speed or prevent the refuse vehicle 10 from exceeding a speed threshold in response to the position data indicating that the telescoping lift arm assembly 100 is not in the transit position. By way of another example, the controller 310 may be configured to monitor the speed data and the position data, and provide a speed indication (e.g., a notification, an alert, a warning, etc.) to the operator via the user interface 330 when the speed of the refuse vehicle 10 reaches or as the speed of the refuse vehicle approaches the speed threshold. The speed indication may (i) request approval to automatically reposition the telescoping lift arm assembly 100 to the transit position or (ii) indicate that the operator should consider manually repositioning the telescoping lift arm assembly 100 to the transit position if the operator wishes to accelerate to an increased speed.

While the lift arm assembly disclosed herein is described as being an extendable or telescoping lift arm assembly, the functions of the control system 300 and the controller 310 described herein may similarly apply to a non-extendable or non-telescoping lift arm assembly.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. A refuse vehicle comprising:
- a chassis;
- a body coupled to the chassis;
- a cab coupled to the chassis and positioned in front of the body; and
- a lift assembly coupled to at least one of the chassis or the body, the lift assembly including:
  - a first arm;
  - a second arm;
  - an implement coupled to the first arm and the second arm;
  - an actuator positioned to pivot the first arm and the second arm to facilitate repositioning the implement between a plurality of positions including a stowed position where the implement is positioned above the body, a working position where the implement is positioned in front of the cab, and a transit position between the stowed position and the working position; and
  - a control system configured to:
    - control a user interface to provide a graphical user interface displaying, in a first section, a current maximum height of the lift assembly, and, in a second section, an indication of a current position of the lift assembly between the stowed position, the transit position, and the working position;
    - limit a speed of the refuse vehicle to a speed threshold while the lift assembly is not in the transit position; and
    - provide a notification requesting operator approval to reposition the lift assembly to the transit position to permit further acceleration in response to the speed threshold being reached while the lift assembly is not in the transit position.

2. The refuse vehicle of claim 1, further comprising the user interface, the user interface including a plurality of indicators, each of the plurality of indicators associated with a respective one of the plurality of positions.

3. The refuse vehicle of claim 2, wherein each of the plurality of indicators functions as a button, and wherein the button is configured to facilitate user input to command the control system to reposition the lift assembly to the respective one of the plurality of positions associated with the button.

4. The refuse vehicle of claim 1, further comprising the user interface, wherein the user interface includes a display, and wherein the control system is configured to control the display to provide the graphical user interface displaying (i) a first visual indication including a graphical representation of the refuse vehicle indicating the current position of the lift assembly relative to the cab and the body and (ii) a second visual indication indicating the current maximum height of the lift assembly at the current position.

5. The refuse vehicle of claim 4, wherein the control system is configured to control the display to provide the graphical user interface displaying a plurality of selectable buttons, wherein each of the plurality of selectable buttons is associated with a respective one of the plurality of positions, and wherein the plurality of selectable buttons are configured to facilitate user input to command the control system to reposition the lift assembly to a respective one of the plurality of positions associated with a selected one of the plurality of selectable buttons.

6. The refuse vehicle of claim 1, wherein repositioning the lift assembly between the transit position and the working position causes the implement to move past a windshield of the cab, and wherein the control system is configured to automatically reposition the lift assembly closer to the working position from the transit position without requiring operator intervention to accommodate a low clearance environment.

7. The refuse vehicle of claim 6, wherein the control system is configured to:
- acquire at least one of (i) environment data regarding an environment proximate or ahead of the vehicle or (ii) position data regarding the current position of the lift assembly; and
- automatically reposition the lift assembly based on the at least one of the environment data or the position data.

8. The refuse vehicle of claim 7, wherein the control system is configured to acquire the environment data from a remote source off the vehicle, further comprising a position sensor configured to acquire the position data.

9. The refuse vehicle of claim 7, further comprising one or more sensors configured to acquire the at least one of the environment data or the position data.

10. The refuse vehicle of claim 1, wherein the control system is configured to limit a speed of the refuse vehicle in response to the current position not being the transit position.

11. The refuse vehicle of claim 1, wherein each of the first arm and the second arm includes a plurality of arm portions.

12. The refuse vehicle of claim 11, wherein the plurality of arm portions includes at least three arm portions that are at least one of extendable, pivotable, or otherwise repositionable relative to each other.

13. The refuse vehicle of claim 11, wherein the plurality of arm portions includes at least a first arm portion and a second arm portion.

14. The refuse vehicle of claim 13, wherein adjacent ends of the first arm portion and the second arm portion at least partially overlap, are stacked in a side-by-side arrangement or a top-and-bottom arrangement, and slide relative to one another.

15. The refuse vehicle of claim 13, wherein the actuator is a first actuator, wherein each of the first arm and the second arm includes a second actuator positioned to facilitate repositioning the second arm portion relative to the first arm portion.

16. The refuse vehicle of claim 15, wherein the control system is configured to control the second actuator to reposition the second arm portion relative to the first arm portion as the implement is repositioned between the plurality of positions, and wherein the control system is configured to control the second actuator to reposition the second arm portion relative to the first arm portion such that the lift assembly clears the cab.

17. A refuse vehicle comprising:
- a chassis;
- a body coupled to the chassis;
- a cab coupled to the chassis and positioned in front of the body;
- a lift assembly coupled to at least one of the chassis or the body, the lift assembly including:
  - a first arm;
  - a second arm;
  - an implement coupled to the first arm and the second arm; and
  - an actuator positioned to pivot the first arm and the second arm to facilitate repositioning the lift assembly between a plurality of positions including a stowed position where the implement is positioned above the body, a working position where the implement is positioned in front of the cab, and a transit position between the stowed position and the working position, wherein repositioning the lift assembly between the transit position and the working position causes the implement to move past a windshield of the cab; and
- a control system configured to:
  - acquire environment data from a GPS system regarding an environment ahead of the vehicle;
  - acquire position data regarding a current position of the lift assembly;
  - identify a low clearance environment and that the current position is the transit position based on the environment data and the position data; and
  - automatically reposition the lift assembly closer to the working position from the transit position prior to the refuse vehicle encountering the low clearance environment in response to the position data indicating that the lift assembly needs to be repositioned to accommodate the low clearance environment.

18. A refuse vehicle comprising:
- a chassis;
- a body coupled to the chassis;
- a cab coupled to the chassis and positioned in front of the body;
- a lift assembly coupled to at least one of the chassis or the body, the lift assembly including:
  - a first arm;
  - a second arm;
  - an implement coupled to the first arm and the second arm; and
  - an actuator positioned to pivot the first arm and the second arm to facilitate repositioning the implement between a plurality of positions including a stowed position where the implement is positioned above the body, a working position where the implement is positioned in front of the cab, and a transit position between the stowed position and the working position, wherein repositioning the lift assembly between the transit position and the working position causes the implement to move past a windshield of the cab;
- a user interface including a display screen; and
- a control system configured to:
  - control the display screen to provide a graphical user interface displaying (i) a first visual indication including a graphical representation of the refuse vehicle indicating a current position of the lift assembly relative to the cab and the body and (ii) a second visual indication indicating a current maximum height of the lift assembly at the current position;
  - in response to a speed threshold being reached while the lift assembly is not in the transit position, (i) limit a speed of the refuse vehicle and (ii) provide a notification via the user interface requesting operator approval to reposition the lift assembly to the transit position to permit further acceleration;
  - acquire environment data from a GPS system regarding an upcoming low clearance environment; and
  - automatically reposition the lift assembly closer to the working position from the transit position based on the environment data without requiring operator intervention to accommodate a low clearance environment prior to the refuse vehicle encountering the low clearance environment.

* * * * *